(12) United States Patent
Gu et al.

(10) Patent No.: US 7,980,097 B2
(45) Date of Patent: Jul. 19, 2011

(54) METHODS AND SYSTEMS FOR CONTROLLING TEMPERATURE OF A BUSHING

(75) Inventors: Pu Gu, Gastonia, NC (US); Timothy S. McAbee, Forest City, NC (US); James C. Peters, Shelby, NC (US); Mark Patrick DeLong, Clemmons, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 165 days.

(21) Appl. No.: 11/590,088

(22) Filed: Oct. 31, 2006

(65) Prior Publication Data
US 2007/0101769 A1    May 10, 2007

Related U.S. Application Data

(60) Provisional application No. 60/732,461, filed on Oct. 31, 2005.

(51) Int. Cl.
*C03B 37/07* (2006.01)
*C03B 37/092* (2006.01)
*G01N 21/00* (2006.01)

(52) U.S. Cl. ............... 65/377; 65/381; 65/384; 65/484; 65/488; 65/499

(58) Field of Classification Search ............ 65/376–377, 65/382, 406, 475, 479, 484–491
See application file for complete search history.

(56) References Cited

U.S. PATENT DOCUMENTS

| | | | |
|---|---|---|---|
| 3,274,324 A * | 9/1966 | Stalego | 373/28 |
| 3,883,279 A | 5/1975 | Heyer | |
| 4,123,242 A * | 10/1978 | Imoto et al. | 65/491 |
| 4,272,271 A | 6/1981 | Thompson | |
| 4,544,392 A | 10/1985 | Sheinkop | |
| 4,546,485 A * | 10/1985 | Griffiths et al. | 373/28 |
| 4,594,087 A * | 6/1986 | Kuhn | 65/488 |
| 4,738,700 A | 4/1988 | Grundy | |
| 4,775,400 A * | 10/1988 | Wright et al. | 65/384 |

(Continued)

FOREIGN PATENT DOCUMENTS

EP    0 207 185 A    1/1987

(Continued)

OTHER PUBLICATIONS

International Preliminary Report on Patentability dated May 15, 2008 for International Application No. PCT/US2006/042463.
PCT Search Report and Written Opinion Dated Nov. 15, 2007 for International Application No. PCT/US2006/042463.
Loewenstein,K., The Manufacturing Technology of Continuous Glass Fibers, Glass Science and Technology 6, Third completely revised edition, pp. 119-165, 1993.

*Primary Examiner* — Matthew J Daniels
*Assistant Examiner* — Jodi Cohen
(74) *Attorney, Agent, or Firm* — Andrew Siminerio (57) ABSTRACT

Various embodiments of the present invention relate to glass fiber forming bushings, to methods of controlling the temperature of bushings having multiple segments, to systems of controlling the temperature of bushings having multiple segments, and to other systems and methods. In one embodiment, a method of controlling the temperature of a bushing having multiple segments comprises forming a plurality of filaments from a bushing comprising at least two segments, gathering the filaments into at least two ends, measuring the size of each of the at least two ends, comparing the measured size of the at least two ends to a desired end size, adjusting the amount of current passing through the at least two bushing segments in response to the end size comparisons.

26 Claims, 5 Drawing Sheets

U.S. PATENT DOCUMENTS

| | | | |
|---|---|---|---|
| 4,780,120 A | 10/1988 | Varrasso et al. | |
| 4,794,625 A | 12/1988 | Grundy | |
| 5,051,121 A * | 9/1991 | Grundy | 65/384 |
| 5,071,459 A * | 12/1991 | Kuhn | 65/384 |
| 5,110,333 A * | 5/1992 | McCormick | 65/492 |
| 5,147,431 A | 9/1992 | Gaertner | |
| 5,857,253 A | 1/1999 | DeLong | |
| 5,879,427 A | 3/1999 | Palamara | |
| 5,935,291 A | 8/1999 | Kim et al. | |
| 6,044,666 A | 4/2000 | Burger et al. | |
| 6,070,437 A | 6/2000 | Sanik et al. | |
| 6,167,728 B1 | 1/2001 | Varrasso et al. | |
| 6,177,656 B1 | 1/2001 | Varrasso et al. | |
| 6,207,737 B1 | 3/2001 | Schell et al. | |
| 2003/0177793 A1 * | 9/2003 | Kock et al. | 65/384 |

FOREIGN PATENT DOCUMENTS

| | | |
|---|---|---|
| GB | 947414 | 1/1964 |
| WO | WO 96/11886 | 4/1996 |

* cited by examiner

METHODS AND SYSTEMS FOR CONTROLLING TEMPERATURE OF A BUSHING

CROSS-REFERENCE TO RELATED APPLICATION

This application claims priority to, and incorporates by reference in full, the following application of Applicant: U.S. Provisional Patent Application No. 60/732,461, filed Oct. 31, 2005, entitled "Methods and Systems for Controlling Temperature of a Bushing."

FIELD OF THE INVENTION

The present invention relates generally to bushings and to methods and systems for controlling the temperature of a bushing and, in particular, to methods and systems for controlling the temperature of a fiber glass bushing.

BACKGROUND OF THE INVENTION

Glass fibers are produced by drawing multiple streams of molten glass at a given rate of speed through orifices or nozzles located in a heated container known in the fiber glass industry as a bushing. The bushings containing the molten glass are electrically heated and maintained at given temperatures to provide molten glass at the orifices or nozzles at a desired viscosity. The fibers drawn from the orifices or nozzles are gathered after they solidify into one or more strands and wound into one or more packages.

Bushings having 800 to 4,000 or more orifices or nozzles are commonplace in the industry, although bushings having fewer orifices or nozzles are also used. It is also common practice to produce more than one strand from a bushing. For example, two strands, four strands, or other numbers of strands are sometimes produced from a single bushing. Such an arrangement is generally referred to as a split-bushing. Typically, this is accomplished by dividing the bushing into sections or segments with each section or segment providing one strand. Splitting the bushing in this manner to produce more than one strand can require precise control of the bushing section temperatures so that the strands produced and wound into packages have the same yardage, i.e., the same yards per pound of glass or, viewed in another way, the same weight of glass strand per package collected for a given period of time.

The development of technology for adjusting bushing heat patterns and controlling formation of the individual strands, and in particular the coefficient of variation in the filament diameters, has progressed from moving manual fin coolers, which provide large but somewhat imprecise bushing adjustments, to three and four terminal controllers which adjust the electrical current in each section of the bushing by shunting a controlled current around sections of the bushing to produce variable heating. Bushing balance controllers that actively monitor and control the temperature of each bushing by shunting current have also been developed. Examples of bushing balance controllers are described in U.S. Pat. Nos. 5,051,121 and 5,071,459, which are hereby incorporated by reference. In the shunting of current around sections of the bushing using terminals, the terminals have been conventionally positioned on a single side of the bushing.

SUMMARY

The present invention relates generally to methods and systems for controlling the temperature of a bushing. Some embodiments of methods and systems of the present invention can be effective in improving the manufacturing process for producing fibers, such as glass fibers.

Some embodiments of the present invention relate to methods of controlling the temperature of a bushing having multiple segments. In one embodiment, a method of controlling the temperature of a bushing having multiple segments comprises forming a plurality of filaments from a bushing comprising at least two segments, gathering the filaments into at least two ends, measuring the size of each of the at least two ends, comparing the measured size of the at least two ends to a desired end size, adjusting the amount of current passing through at least one of the bushing segments in response to the end size comparisons. Sizes that can be compared in various embodiments of the present invention can include weights of packages, diameters of packages, diameters of ends, and/or other size parameters. Additional embodiments and other methods are described below in the Detailed Description.

Some embodiments of the present invention relate to systems of controlling the temperature of bushings having multiple segments. In one embodiment, a system of controlling the temperature of a bushing having multiple segments comprises a glass fiber forming bushing comprising a tip plate comprising orifices adapted to pass glass to form filaments, two opposing side walls extending upwardly from the periphery of the tip plate, and two opposing en d walls extending upwardly from the periphery of the tip plate and connected to the two side walls to form a reservoir for molten glass; a source of current coupled to a terminal on the first end wall and coupled to a terminal on the second end wall; means for regulating the current passing through each bushing segment, the regulating means coupled to a terminal on the first side wall; means for measuring the size of fiber glass formed from the bushing; and a controller in communication with the measuring means and the regulating means. In some embodiments, the regulating means comprises an adjustable current passing device. Additional embodiments and other systems are described below in the Detailed Description.

Some embodiments of the present invention relate to glass fiber forming bushings. In one embodiment, a glass fiber forming bushing comprises a tip plate comprising orifices adapted to pass glass to form filaments, two opposing side walls extending upwardly from the periphery of the tip plate, two opposing end walls extending upwardly from the periphery of the tip plate and connected to the two side walls to form a reservoir for molten glass, a terminal coupled to a first side wall, a terminal coupled to a second side wall, a terminal coupled to a first end wall, and a terminal coupled to a second end wall. Additional embodiments and other systems are described below in the Detailed Description.

These and other embodiments of the present invention are described in greater detail in the detailed description which follows.

DETAILED DESCRIPTION

For the purposes of this specification, unless otherwise indicated, all numbers used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Temperature and flow velocity variations in molten fiberizable material at the tip plate of a bushing used in the production of continuous fibers can be detrimental to both the quality of the fibers produced and the efficiency of the production process. Some embodiments of the present invention can improve the uniformity of the temperature and the flow velocity of the molten fiberizable material at the tip plate of a bushing. Some embodiments of the present invention are believed to assist in improving the uniformity of the diameter of the fibers being produced, and/or in reducing break-out of the fibers during the attenuation process, and/or in improving process efficiency.

As will be discussed in detail below, improvements in temperature and flow velocity uniformity at the tip plate of a bushing can be achieved, in some embodiments, by adding and/or shunting electrical current in segment(s) of the bushing.

As explained below, bushings are typically constructed from conductive materials. Current is passed through a bushing in order to heat the bushing and maintain the flow of molten fiberizable material through the bushing. In production, a bushing may have "hot" spots or "cold" spots where the temperature in a particular location is higher or lower than the temperature in other locations, or higher or lower than an average temperature across the bushing. Such temperature deviations may occur for a number of reasons. For example, the bushing may be cooler at locations near its periphery than in its center.

In the past, current has been shunted from the bushing in order to control the temperature of the bushing. As used herein, the term "shunt", when used in connection with the shunting of current, means to divert from the bushing at least a portion of the total current provided to the bushing. The current can be shunted through a shunting circuit. The current, in some embodiments, can be returned to the bushing at another location. In some embodiments, the current may not be returned to the bushing. The shunted current results in the reduction of temperature of the bushing segments from which the current has been diverted.

While the term "segments" is used herein, it should be understood by those of skill in the art that a bushing is not necessarily physically divided into segments. Unless otherwise stated herein, the term "segment" refers to various zones of the bushing from which a plurality of filaments are gathered to form an end, with one end being associated with each segment. The term "end" as used herein means a multiplicity of fibers grouped together.

In one embodiment, a method of controlling the temperature of a bushing having multiple segments comprises forming a plurality of filaments from a bushing comprising at least two segments, gathering the filaments into at least two ends, measuring the size of each of the at least two ends, comparing the measured size of the at least two ends to a desired end size, and adjusting the amount of current passing through at least one of the bushing segments in response to the end size comparisons. In some embodiments, each end can be formed from a separate bushing segment. In some embodiments, the bushing can comprise two or more terminals, at least two of the terminals being coupled to opposite side walls of the bushing. Some embodiments of methods of the present invention can further comprise winding ends into one or more packages. In some embodiments, each end can be wound into a separate package.

Sizes that can be compared in various embodiments of the present invention can include weights of forming packages, diameters of forming packages, diameters of ends, and/or other size parameters. In some embodiments, a single size parameter can be measured, while in other embodiments, two or more size parameters can be measured. For example, in some embodiments where two or more size parameters are measured, the weight and diameter of forming packages can be measured.

In some embodiments where each end is wound into a separate package, measuring the size of each of the at least two ends comprises weighing each package. In some of these embodiments, comparing the measured size of the at least two ends to a desired end size comprises comparing the weight of each package to a desired package weight.

When the weight of the package formed from a bushing segment is less than the desired package weight, adjusting the amount of current passing through a bushing segment comprises increasing the amount of current passing through the bushing segment in some embodiments. Increasing the amount of current passing through the bushing segment can comprise adding current in a terminal proximate the bushing segment in some embodiments.

In other embodiments, when the weight of the package formed from a bushing segment is less than the desired package weight, adjusting the amount of current passing through a bushing segment comprises shunting less current around the bushing segment. Shunting less current around the bushing segment can comprise, in some embodiments, reducing the current removed from the bushing at a terminal proximate the bushing segment.

In some embodiments, when the weight of the package formed from the bushing segment is greater than the desired package weight, adjusting the amount of current passing through a bushing segment can comprise, shunting current around the bushing segment.

While some embodiments comprise measuring the weight of each package, the diameter of each package can be measured in some embodiments. In such embodiments, measuring the size of each of the at least two ends comprises measuring the diameter of each package. In embodiments where the package diameters are measured, comparing the measured size of the at least two ends can comprise comparing the diameter of each package to a desired package diameter. When the diameter of the package formed from the bushing segment is less than the desired package diameter, in some embodiments, adjusting the amount of current passing through a bushing segment can comprise increasing the amount of current passing through the bushing segment. In other embodiments, increasing the amount of current passing through a bushing segment can comprise injecting current in a terminal proximate the bushing segment.

When the diameter of the package formed from a bushing segment is less than the desired package diameter, in some embodiments, adjusting the amount of current passing through the bushing segment can comprise shunting less current around the bushing segment in some embodiments. Shunting less current around the bushing segment, in some embodiments, comprises reducing the current removed from the bushing at a terminal proximate the bushing segment.

When the diameter of the package formed from a bushing segment is greater than the desired package diameter, adjusting the amount of current passing through the bushing segment can comprise, in some embodiments, shunting current around the bushing segment. Shunting current around the bushing segment, in some embodiments, can comprise removing current from the bushing at a terminal proximate the bushing segment.

In some embodiments, whether ends are wound into packages or not, measuring the size of each of the at least two ends can comprise measuring the diameter of each end. In some embodiments where the diameter of each end is measured, comparing the measured size of the at least two ends comprises comparing the diameter of each end to a desired end diameter.

When the diameter of the end formed from a bushing segment is less than a desired end diameter, adjusting the amount of current passing through the bushing segment can comprise increasing the amount of current passing through the bushing segment. Increasing the amount of current passing through the bushing segment, in some embodiments, can comprise injecting current in a terminal proximate the bushing segment. When the diameter of the end formed from a bushing segment is less than the desired end diameter, in other embodiments, adjusting the amount of current passing through the bushing segment can comprise shunting less current around the bushing segment. Shunting less current around the bushing segment, in some embodiments, can comprise reducing the current removed from the bushing at a terminal proximate the bushing segment.

When the diameter of an end formed from a bushing segment is greater than a desired end diameter, adjusting the amount of current passing through the bushing segment can comprise shunting current around the bushing segment in some embodiments. Shunting current around the bushing segment, in some embodiments, can comprise removing current from the bushing at a terminal proximate the bushing segment.

Some embodiments of the present invention relate to systems of controlling the temperature of bushings having multiple segments. In one embodiment a system of controlling the temperature of a bushing having multiple segments comprises a glass fiber forming bushing, a source of current coupled to a terminal on a first end wall of the bushing and coupled to a terminal on a second end wall of the bushing, means for regulating the current passing through each bushing segment, the regulating means coupled to a terminal on a first side wall of the bushing, means for measuring the size of fiber glass formed from the bushing, and a controller in communication with the measuring means and the regulating means. In some embodiments, the regulating means comprises an adjustable current passing device.

In some embodiments, the regulating means can be coupled to the terminal on the first end wall and coupled to the terminal on the second end wall. The regulating means, in some embodiments, can also be coupled to terminals on one or more of the side walls. For example, in some embodiments, the regulating means can be coupled to a terminal on a first side wall and a terminal on a second side wall.

The measuring means, in some embodiments, can comprise means for weighing the fiber glass formed from the bushing. In some embodiments, the measuring means can comprise means for measuring the diameter of at least one fiber glass end formed from the bushing. The measuring means, in some embodiments where the fiber glass formed from the bushing comprises at least two fiber glass packages, can comprise means for measuring the diameter of each package formed from a bushing segment. In some embodiments where the fiber glass formed from the bushing comprises at least two fiber glass packages, the measuring means comprises means for measuring the diameters of the at least two fiber glass packages.

Some embodiments of the present invention relate to glass fiber forming bushings. In one embodiment, a glass fiber forming bushing comprises a tip plate comprising orifices adapted to pass glass to form filaments, two opposing side walls extending upwardly from the periphery of the tip plate, two opposing end walls extending upwardly from the periphery of the tip plate and connected to the two side walls to form a reservoir for molten glass, a terminal coupled to a first side wall, a terminal coupled to a second side wall, a terminal coupled to a first end wall, and a terminal coupled to a second end wall. In some embodiments, additional terminals can be coupled to the side walls. For example, in some embodiments, a second terminal can be coupled to the first side wall and/or a second terminal can be coupled to the second side wall. Three or more terminals can be coupled to one or both of the side walls in some embodiments.

The present invention will be discussed generally in the context of its use in the production, assembly, and application of glass fibers, although one skilled in the art would understand that embodiments of the present invention can be useful in forming fibers from other fiberizable materials, such as inorganic substances, which can be drawn into fibers by attenuation through a nozzle. See *Encyclopedia of Polymer Science and Technology*, Vol. 6 at 506-507. As used herein, the term "fiberizable" means a material capable of being formed into a generally continuous filament.

Persons of ordinary skill in the art will recognize that the present invention can be implemented in the production, assembly, and application of a number of glass fibers. Non-limiting examples of glass fibers suitable for use in the present invention can include those prepared from fiberizable glass compositions such as "E-glass", "A-glass", "C-glass", "S-glass", "ECR-glass" (corrosion resistant glass), and fluorine and/or boron-free derivatives thereof. The composition of the glass to be fiberized is not generally important to the present invention, and as such, embodiments of the present invention can be implemented in manufacturing processes for any number of fiberizable glass compositions.

Glass fibers can be formed from molten glass as will be discussed in more detail below. For example, glass fibers can be formed in a direct-melt fiber forming operation or in an indirect, or marble-melt, fiber forming operation. In a direct-melt fiber forming operation, raw materials are combined, melted and homogenized in a glass melting furnace. The molten glass moves from the furnace to a forehearth and into fiber forming apparatuses, such as bushings, where the molten glass is attenuated into continuous glass fibers. In a marble-melt glass forming operation, pieces or marbles of glass having the final desired glass composition are pre-formed and fed into a bushing where they are melted and attenuated into continuous glass fibers. If a premelter is used, the marbles are fed first into the premelter, melted, and then the melted glass is fed into a fiber forming apparatus, such as a bushing, where the glass is attenuated to form continuous fibers. For additional information relating to glass compositions and methods of forming the glass fibers, see K. Lowenstein, *The Manufacturing Technology of Continuous Glass Fibres*, (3d Ed. 1993), at pages 30-44, 47-103, and 115-165, which are specifically incorporated by reference herein.

In a typical direct-melt fiber forming operation, a glass melting furnace and forehearth convey a stream of molten fiberizable material to an outlet fitted with a metallic bushing attached to the bottom of the forehearth. Embodiments of the present invention are directed to methods and systems for controlling the temperature of bushings. Melting furnace and forehearth construction are generally known in the industry, and a disclosure of their details is not necessary for an understanding of embodiments of the present invention. Additional information regarding forehearth construction is available, for example, in K. Loewenstein, *The Manufacturing Technology of Continuous Glass Fibers* (3rd. Ed. 1993), at pages 85-101.

The molten glass flows from the bottom of the bushing through a large number of orifices or "tips" in a tip plate where they can be attenuated by a winder to form glass filaments of desired size. The filaments can then be contacted with an applicator to apply a sizing composition, gathered by a guide to form a sliver or strand, and wound about a collet of a winder. Examples of suitable sizing compositions and winders are set forth in Loewenstein (supra) at pages 186-194 and 237-287. As sizing compositions are generally applied after formation of glass filaments, embodiments of the present invention can generally be implemented in manufacturing processes where any number of sizing compositions (or no sizing composition) are applied to the glass filaments, and the present invention is not intended to be limited to any particular sizing composition. Similarly, the present invention is not intended to be limited to manufacturing processes where any particular winder is used. As is known to those of skill in the art, winders are not required in all processes for forming fiber glass products as the glass fibers can be provided directly to other processing equipment.

Figure 1:
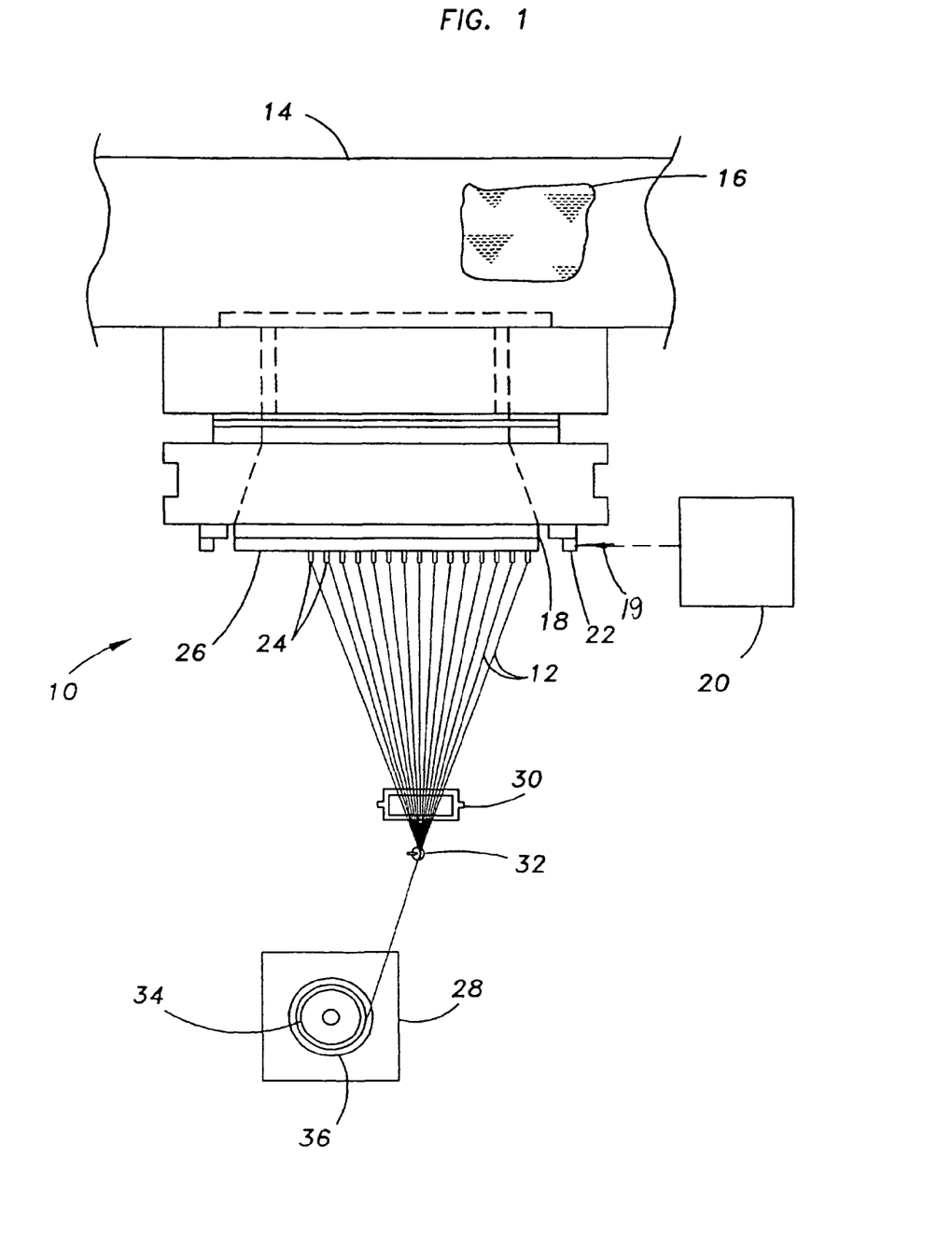
FIG. 1 is a schematic of a non-limiting example of a fiber forming apparatus.

FIG. 1 illustrates a non-limiting example of a typical glass fiber forming apparatus. Persons of skill in the art will recognize that embodiments of the present invention can generally be implemented in most fiber forming operations where a molten material is formed into fibers by passing the molten material through a plurality of orifices or nozzles in a bushing. In the example shown, the fiber forming apparatus 10 comprises a glass melting furnace or forehearth 14 containing a supply of molten fiberizable material or glass 16 having a metallic bushing 18 attached to the bottom of the forehearth 14.

Electrical leads 19 are connected to an electrical energy source 20 and to the bushing 18 at conductors 22 to heat the bushing 18 and molten glass 16 contained therein. Molten glass 16 is drawn from the bottom of the bushing 18 through a plurality of nozzles or orifices 24 in a tip plate 26 by a winder 28 to form glass fibers 12. Typically, the glass fibers 12 are contacted with an applicator 30 to apply a sizing composition thereto and gathered by a guide 32. In the embodiment shown, a winder is utilized, and the gathered glass fibers are wound about a rotatable collet 34 of a winder 28 to form a forming package 36.

Figure 2:
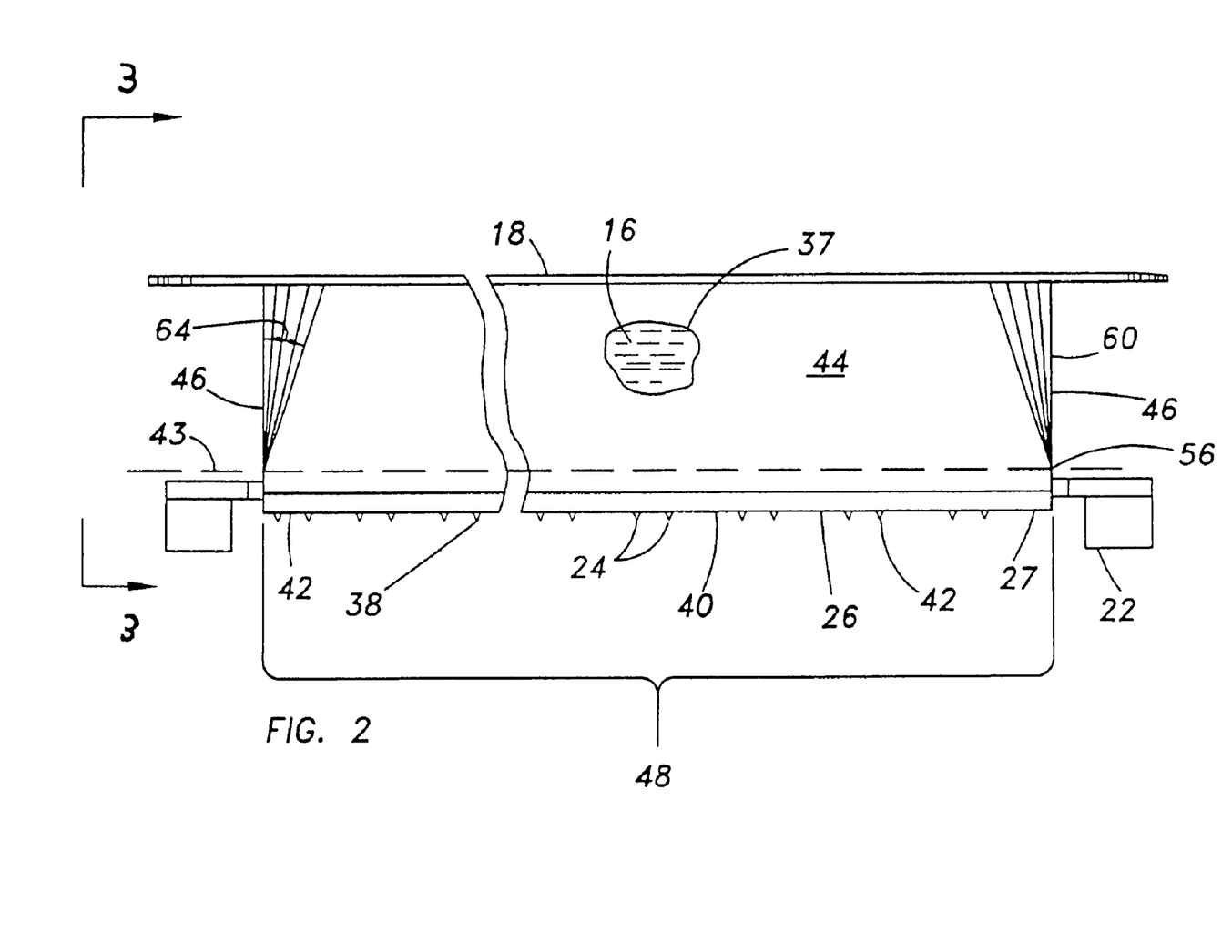
FIG. 2 is a front elevational view of a non-limiting example of a bushing.
Figure 3:
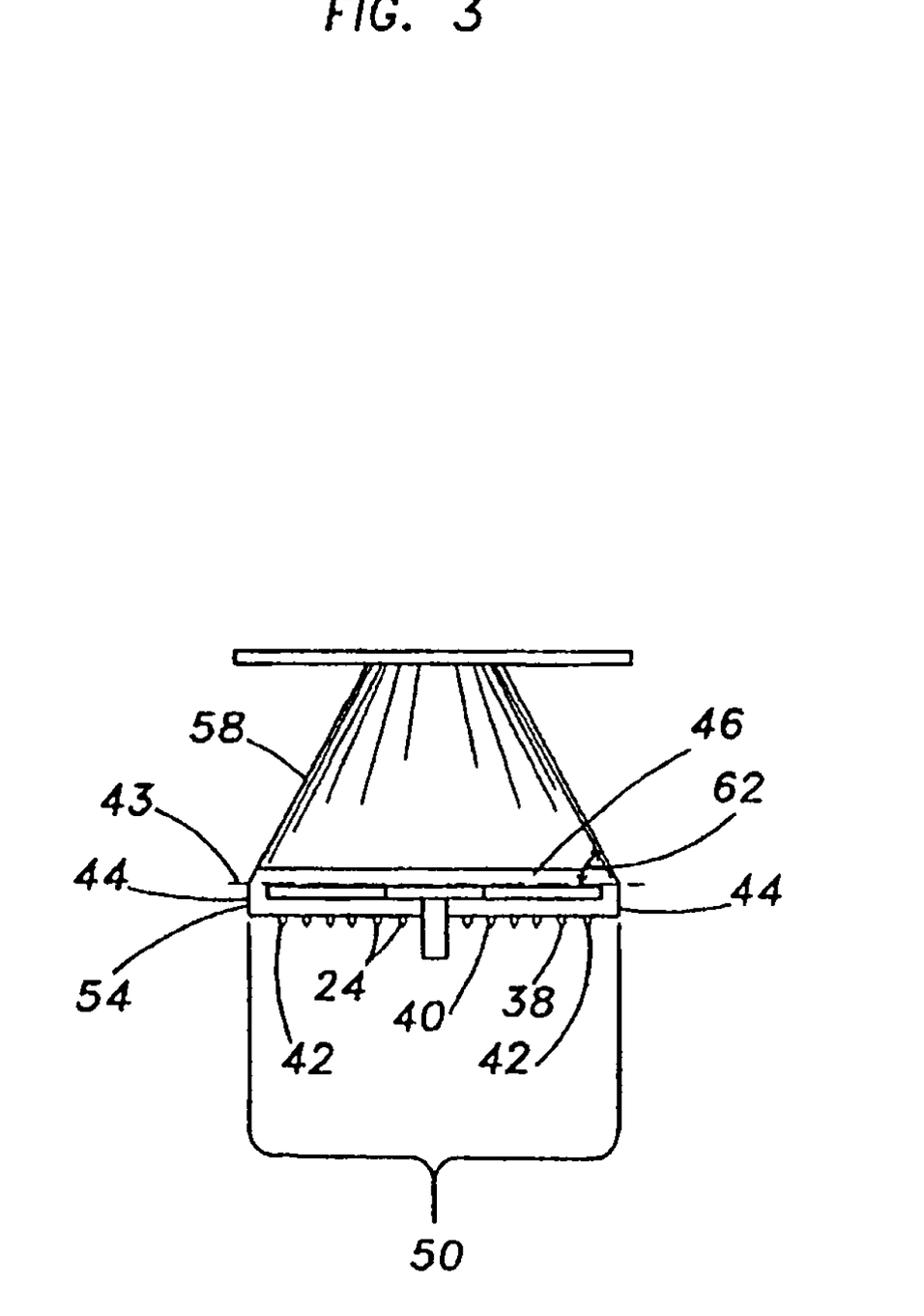
FIG. 3 is an end view of the bushing of FIG. 2, taken along lines 3-3 of FIG. 2.

Referring now to FIGS. 2 and 3, the bushing 18 comprises a generally planar tip plate 26. The length 48 and width 50 of the tip plate 26 can vary. In some embodiments, the length 48 of the tip plate 26 can generally range from about twenty-five to about one hundred twenty-seven centimeters (cm) (about ten to about fifty inches) and the width 50 can generally range from about six to about twenty-five cm (about 2.5 to about 10 inches). In some embodiments, tip plates can generally have a thickness of about one to about three millimeters (mm) (about 0.04 to about 0.12 inches), often about one to about 2.5 mm (about 0.04 to about 0.1 inches). One skilled in the art would understand that the dimensions of the tip plate 26 can vary, as desired. Some embodiments of the present invention can be implemented in existing manufacturing processes where the dimensions of the tip plates are generally already determined, and the present invention is not intended to be limited to tip plates having particular dimensions.

As shown in FIG. 2, the tip plate 26 has an orifice region 38 including a plurality of orifices 24 through which molten glass 16 is drawn in the form of individual fibers 12 or filaments at a high rate of speed. It can be desirable to maintain the orifices at a generally uniform temperature during drawing of the molten glass 16 therethrough as to assist in producing fibers 12 having a generally uniform diameter. As set forth in more detail herein, some embodiments of the present invention are related to methods and systems for controlling the temperature of bushings, which can assist in producing fibers having a generally uniform diameter.

The orifice region 38, in the non-limiting embodiment shown, comprises a central region 40 which is surrounded by a peripheral region 42. The central region 40 generally comprises between about 25 to about 85 percent of the total surface area of the orifice region 38 in some embodiments, and about 50 to about 65 percent in other embodiments. The length and width of the central region 40 can vary depending upon the dimensions of the tip plate 26. The peripheral region 42 includes portions of the orifice region 38 which are adjacent to the side walls 44 and end walls 46 of the bushing 18. In conventional bushings, molten glass adjacent this peripheral region 42 tends to be cooler than molten glass adjacent the central region 40, contributing to fiber breakage and non-uniform filament diameters.

Referring now to FIGS. 2 and 3, the bushing 18 comprises at least one side wall extending generally upwardly from a periphery 27 of the tip plate 26 to form a supply or reservoir 37 for containing the molten glass 16. In the embodiment shown and in typical embodiments of bushings, the bushing 18 comprises a pair of opposed side walls 44 and a pair of opposed end walls 46 extending upwardly from the periphery 27. The side walls 44 and end walls 46 can be generally planar or curved, as desired. In the non-limiting embodiment shown in FIG. 2, each of the side walls 44 and end walls 46 can include a generally planar lower portion 54, 56 proximate the tip plate 26 and an upper portion 58, 60. The upper portions 58, 60 of side walls 44 can be inclined at an angle 62 with respect to the corresponding lower portions 54, 56. The angle 62, in some non-limiting embodiments, can range from about 45° to about 90°. Corner portions 59 of the upper portions 58, 60 of the end walls 46 can also be inclined at an angle 64 with respect to the corresponding lower portions 56 of the end walls 46. The angle 64, in some non-limiting embodiments, can range from 0° to about 45°. Some embodiments of the present invention can be implemented in existing manufacturing processes where the dimensions and angles are generally already determined, and the present invention is not intended to be limited to particular dimensions and angles.

The shape of the reservoir 37 can be generally cylindrical, a square box, or a rectangular box formed by the opposed side walls 44 and opposed end walls 46 in some non-limiting embodiments, or can be other shapes.

The components of the bushing 18, such as the side walls 44, end walls 46, and tip plate 26 can be formed from a metallic material or alloys thereof by conventional metalworking and processing techniques well known to those skilled in the art. The metallic material can have a number of properties known to those of skill in the art including, without limitation, being resistant to corrosion by glass, not degrading to contaminate the glass, being oxidation resistant, possessing steady electrical resistance and resistance to creep (deformation under load, which is a function of stress), and combinations thereof. See, e.g., Loewenstein (supra) at pages 122-126, which are hereby incorporated by reference.

Non-limiting examples of suitable metallic materials for forming the components of the bushing 16 include platinum, rhodium and alloys thereof. In some embodiments, the metallic material can be about a 10% to about 20% rhodium-platinum alloy, and in some embodiments, about 10% rhodium-platinum alloy. The metallic materials can be dispersion strengthened or grain-stabilized to reduce creep, if desired. If more information regarding suitable dispersion strengthened or grain-stabilized metallic materials is desired, see Loewenstein (supra) at page 124. Non-limiting examples of dispersion strengthened metal metallic plates are commercially available as ZGS products from Johnson, Matthey & Co. Ltd. of Malvern, Pa.

Bushings can be formed using techniques known to those of skill in the art. For example, the bushing 18 shown can be formed by joining the pair of opposed side walls 44 and the pair of opposed end walls 46 to the tip plate 26 by welding to form the bushing 18. An example of a suitable welding technique is the tungsten inert gas welding technique, which is well known to those skilled in the art. A non-limiting example of a suitable bushing is disclosed in U.S. Pat. No. 5,147,431, which is hereby incorporated by reference. For additional information regarding fiber forming apparatuses and bushings, see also U.S. Pat. Nos. 5,857,253, 5,879,427, 5,935,291, and 6,044,666, which are hereby incorporated by reference. Loewenstein (supra) also discusses bushings extensively at pages 119-165.

Bushings can be removably affixed to the underside of a forehearth for use in a fiber forming operation using techniques known to those of skill in the art. Additional information regarding the affixing of a bushing to a forehearth can be found in U.S. Pat. Nos. 5,879,427, 5,935,291, and 6,044,666, and in Loewenstein (supra) at pages 137-141.

During the formation of glass fibers, the bushing is heated to maintain the flow of molten fiberizable material through the bushing. Bushings are typically heated by passing current through them. For example and as shown above in connection with FIG. 1, electrical leads 19 can be connected to an electrical energy source 20 and to the bushing 18 at conductors 22 to heat the bushing 18 and molten glass 16 contained therein.

A bushing may have "hot" spots or "cold" spots where the temperature in a particular location is higher or lower than the temperature in other locations, or higher or lower than an average temperature across the bushing. Such temperature deviations may occur for a number of reasons. For example, the bushing may be cooler at locations near its periphery than in its center.

In the past, current has been shunted from the bushing in order to reduce the temperature of the bushing. As used herein, the term "shunt", when used in connection with the shunting of current, means to divert from the bushing at least a portion of the total current being passed through the bushing. The current can be shunted through a shunting circuit. The current, in some cases, is returned to the bushing at another segment, and in other cases, may not be returned to the bushing. The shunted current results in reducing the temperature of the bushing segments from which the current has been diverted.

Bushing balance controllers that actively monitor and control the temperature of each bushing by shunting current have been developed. Examples of bushing balance controllers are described in U.S. Pat. Nos. 5,051,121 and 5,071,459, which are hereby incorporated by reference.

Some embodiments of the present invention relate to glass fiber forming bushings which can have improved temperature profile uniformity. In some embodiments, such glass fiber forming bushings are adapted to facilitate the use of current addition and/or current shunting to control the temperature of the bushing.

Figure 4:
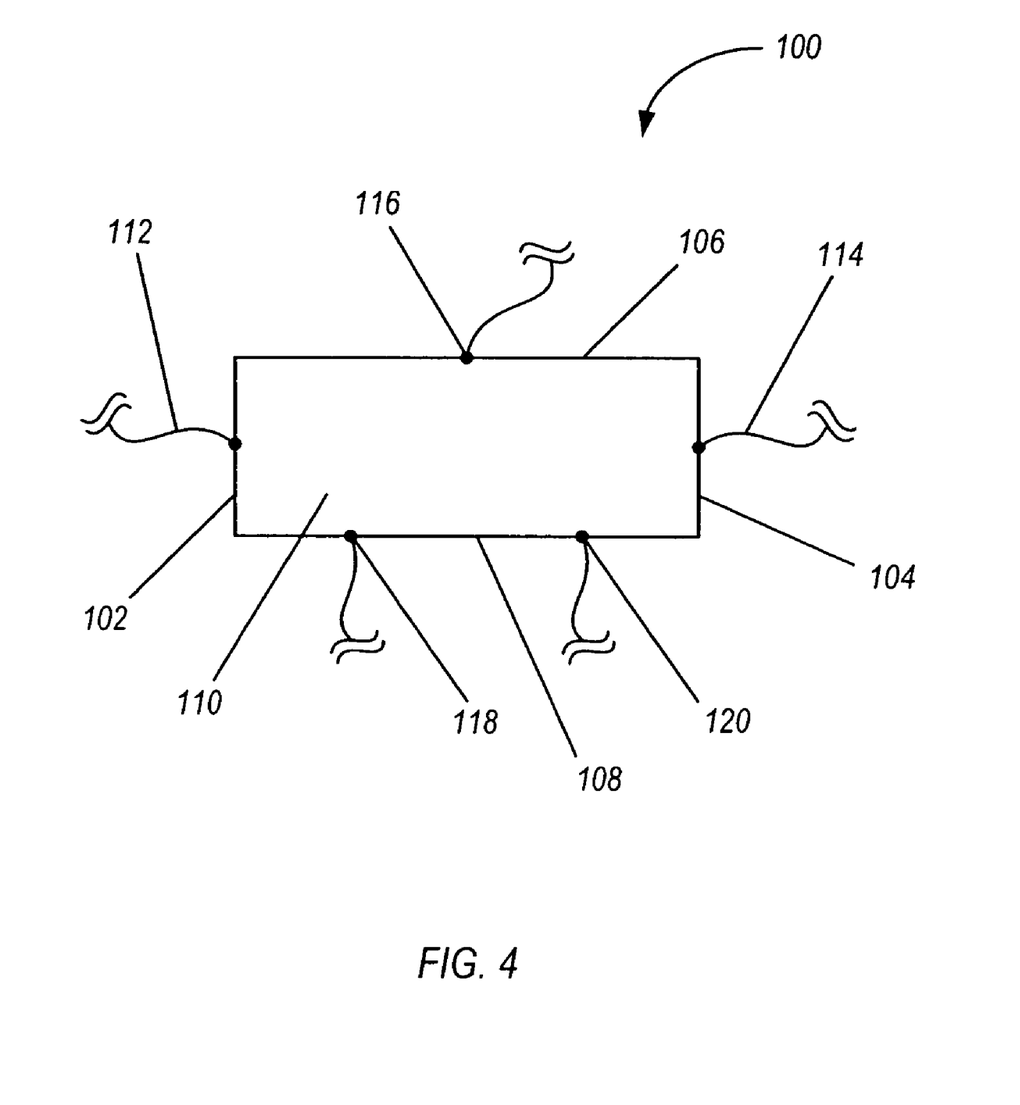
FIG. 4 is a bottom schematic view of a non-limiting embodiment of a bushing (orifices not shown) illustrating connection of the bushing with terminals.

FIG. 4 is a schematic bottom elevational view of an example of a glass fiber forming bushing 100 according to one embodiment of the present invention. The bushing 100 comprises opposing end walls 102,104 and opposing side walls 106,108 on the periphery of a tip plate 110. The tip plate can include a plurality of orifices (not shown in FIG. 4) through which molten glass can be drawn in the form of individual fibers or filaments. The opposing side walls 106, 108 and the opposing end walls 102, 104 are connected to form a reservoir. When the bushing 100 is installed beneath a forehearth or other source of molten glass, the portion of the tip plate 110 shown in FIG. 4 faces downward and the end walls 102,104 and side walls 106,108 extend upwardly to form a reservoir for molten glass.

The bushing 100 further comprises a plurality of terminals coupled to the various walls of the bushing 100. The terminals are electrical connectors that, when coupled with electrical lines, can allow current to be added and/or removed from the bushing 100. In the non-limiting embodiment shown in FIG. 4, a terminal 112 is coupled to the first end wall 102, a terminal 114 is coupled to the second end wall 104, a terminal 116 is coupled to the first side wall 106, and two terminals 118,120 are coupled to the second side wall 108. Each of the terminals is illustrated with a portion of an electrical line extending from them. The electrical lines can be connected to various devices that allow current to be added to and/or removed from the bushing 100.

In order to explain other embodiments, each general location on a bushing where a terminal is coupled can be referred to as a terminal site. In some embodiments, one or more terminals may be coupled to a terminal site. For example, in some embodiments two terminals can be coupled to the bushing at a terminal site. In some embodiments having two terminals coupled to a terminal site, a first terminal can be coupled to an electrical line to allow current to be added to the bushing, and a second terminal can be coupled to an electrical line to allow current to be removed from the bushing. In some embodiments, a single terminal can be coupled to both an electrical line allowing current to be added to the bushing and an electrical line allowing current to be removed from the bushing.

In some embodiments, a bushing can comprise one or more terminal sites on a first side wall and one or more terminal sites on a second side wall. In some embodiments, each terminal site can comprise at least two terminals coupled to the bushing. In some embodiments with at least two terminals coupled to the bushing at a terminal site, a first terminal can be coupled with an electrical line to allow current to be added to the bushing, and a second terminal can be coupled with an electrical line to allow current to be removed from the bushing. In such embodiments, current can be added to and/or removed from the bushing at each terminal site. In other embodiments, each terminal site can comprise one terminal coupled to the bushing. In such embodiments, the terminal can be coupled with an electrical line to allow current to be removed from the bushing, can be coupled with an electrical line to allow current to be added to the bushing, or can be coupled with a first electrical line to allow current to be removed from the bushing and with a second electrical line to allow current to be added to the bushing.

The presence of one or more terminal sites on each of the side walls (the longer of the two dimensions) according to some embodiments of bushings of the present invention can provide improved temperature uniformity over the bushing. For example, when current is shunted from the bushing at a terminal, the area of the bushing proximate the terminal tends to be cooler than other portions of the bushing. By positioning terminal sites on each of the side walls, such cooling effects are spread more evenly across the bushing which can result in improved temperature control.

While the embodiments of bushings shown in FIG. 4 and FIG. 5 (discussed below) are four segment bushings having one terminal site on a first side wall and two terminal sites on a second side wall, other embodiments of the present invention can comprise different numbers of terminal sites on each of the side walls. For example, in another embodiment, a first side wall can comprise three terminal sites and a second side wall can comprise two terminal sites. As another example, a bushing can comprise five terminal sites on each side wall. A number of factors can be important in selecting the number of terminal sites on each side wall of a bushing including, without limitation, heat distribution, size of the bushing, bushing geometry, tip patterns, temperature distribution control, position of each terminal, economic costs of the number of terminals, the sizing of the conductors, placement of wires in view of entire glass fiber forming system, etc.

Figure 5:
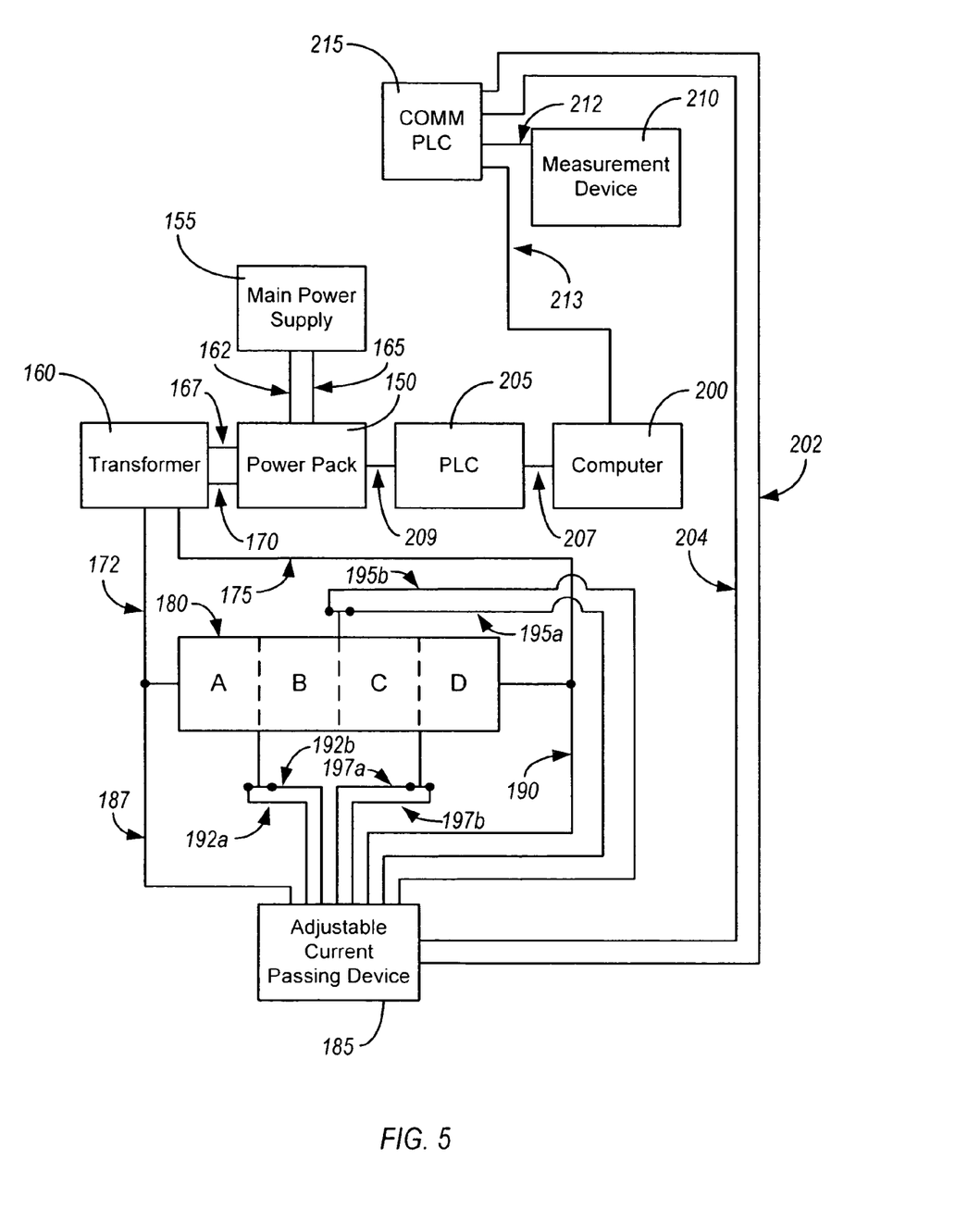
FIG. 5 is a block diagram of an example of a multiple segment bushing and a system for controlling the temperature of a bushing.

In the embodiments of bushings shown in FIG. 4 and FIG. 5, the terminal sites are generally spaced evenly along the bushing side walls (each terminal site being positioned at ¼, ½, and ¾ the length of the side walls) to coincide with the boundaries of the bushing segments. In other embodiments, the terminal sites are not evenly spaced. In some embodiments, the terminal sites can be evenly spaced on a first side wall, but not on a second side wall.

In some embodiments of bushings, the terminals can have a diameter that maximizes conductivity while also minimizing the effect on the current flow throughout the bushing. The terminals of a proper diameter can help minimize the potential effects of acting as a heat sink by drawing too high of a current from the heating of the bushing. In some embodiments, the terminal diameter can be between about 0.090 inches and about 0.250 inches. In some embodiments the terminal size is about 0.180 inches.

In some embodiments, a bushing can also comprise one or more terminal sites on a first end wall and one or more terminal sites on a second end wall, each terminal site comprising at least two terminals coupled to the bushing. In some embodiments with at least two terminals coupled to the bushing at a terminal site, a first terminal can be coupled with an electrical line to allow current to be added to the bushing, and a second terminal can be coupled with an electrical line to allow current to be removed from the bushing. In such embodiments, current can be added to and/or removed from the bushing at each terminal site. In some embodiments, only one terminal may be present on an end wall. For example, a second end wall 104 (assuming current is flowing generally from the first end wall 102 to the second end wall 104) may only include one terminal in some non-limiting embodiments, such terminal being coupled with an electrical line to allow current to be removed from the bushing. In some embodiments, a single terminal can be provided on an end wall which is coupled to two electrical lines-one allowing current to be added and one allowing current to be removed.

With regard to a terminal site on a first end wall 102 (assuming current is flowing generally from the first end wall 102 to the second end wall 104), a single terminal coupled to the bushing to add current to the bushing may be present in some embodiments. In some embodiments, a second terminal may be provided at the terminal site to reduce the amount of current added to the bushing. For example, if the source of current provides 150 amperes of current, but only 100 amperes are needed to heat the bushing, fifty amperes can be diverted from the bushing using the electrical line coupled to the second terminal. Rather than coupling a second terminal to the bushing at the terminal site, the current provided to the bushing through the first terminal can be reduced using other techniques.

FIG. 5 is a block diagram illustrating an example of a system for controlling the temperature of a glass fiber forming bushing having multiple segments according to one embodiment of the present invention. Embodiments of systems of the present invention comprise a source of current. The source of current also has a voltage associated with it. In some embodiments, the current and voltage supplied to the bushing may need to be adjusted from the current and voltage provided by a power supply. For example, in an industrial setting, the voltage provided from the main power supply may need to be reduced. As another example, sufficient current needs to be provided to the bushing to heat the bushing to temperatures desirable for fiberizing glass compositions. The ways in which the voltage and current from the main power supply might be adjusted are not critical to the present invention, and persons of skill in the art can use known techniques to adjust the current and voltage received from a main power supply to provide the appropriate current and voltage to a bushing.

In the embodiment shown in FIG. 5, a power pack 150 and a transformer 160 are utilized. The power pack 150 in this non-limiting embodiment adjusts the voltage from the main power supply 155. For example, the main power supply 155 might provide 480V three phase alternating current to the power pack 150 and be converted to 0-125 A/0-480V alternating current. In some embodiments, the power pack 150 may only use two lines, or a single phase, of the supplied, three phase power. In settings where a main power supply provides power to multiple bushings, the lines selected by the various power packs can vary, in some embodiments, to balance the load of the main power supply. A non-limiting example of a power pack useful in some embodiments of the present invention is a Spang Power Electronics Model

K-5349 power pack. In alternative embodiments, a main power supply might provide direct current.

In some embodiments, including embodiments where a power pack is used and embodiments where a power pack is not used, the current and voltage from a power supply may need to be further adjusted prior to providing current and voltage to a bushing. For example, in some embodiments, the voltage may need to be decreased (and the current increased) prior to supplying the voltage and current to the bushing. Transformers can be used in some non-limiting embodiments to adjust the current and voltage provided. In FIG. 5, a transformer 160 is used in connection with a power pack 150 to adjust the current and voltage from the main power supply 155 to appropriate levels for fiberizing glass compositions. For example, if a power pack provides single phase 0-125 A/0-480V alternating current, a transformer might be used to convert it to 0-6000 A/0-10V alternating current. Such a transformer can be referred to as a step down transformer. As another example, a transformer might convert 0-125 A/0-480V alternating current to 2000 A/50V alternating current in some embodiments.

As indicated above, equipment, such as a power pack and a transformer, can be used to adjust the amount of voltage and current provided to a bushing from a main power supply. In some embodiments, no such equipment is needed as the voltage and current provided may be sufficient. In other embodiments, other equipment can be used to provide current to a bushing. Further, it should be understood that embodiments of the present invention can be developed using alternating current, using direct current, converting alternating current to direct current, etc. The total current supplied to a bushing (whether from a main power supply, a power pack, a transformer, or otherwise) can be adjusted in some embodiments to also change bushing temperature. Such adjustments might be made, in some embodiments, in connection with general temperature changes across the entire bushing.

Referring to FIG. 5, there is shown input lines 162,165 feeding into the power pack 150. Electrical leads 167,170 from power pack 150 feed current into the primary coil of the transformer 160. Secondary coil of the transformer 160 is connected across electrical lines 172,175. Also connected across lines 172,175 and parallel to transformer 160 is bushing 180.

Although not limiting the present invention to the particular embodiment shown in FIG. 5, the bushing 180 is divided into four segments—A, B, C, and D. As noted above, while the term "segments" is used, it should be understood by those of skill in the art that the bushing is not necessarily physically divided into segments and that the term "segment" refers to various zones of the bushing from which a plurality of filaments are gathered to form an end, with one end being associated with each segment. The term "end" as used herein means a multiplicity of fibers grouped together.

In some embodiments, a terminal site can be positioned on a side wall of the bushing generally between bushing segments. As illustrated in the non-limiting embodiment shown in FIG. 5, the boundary of each segment illustrated in that embodiment is generally defined by an imaginary line starting at a terminal site and running across the bushing parallel to the end walls. In the non-limiting embodiment shown in FIG. 5, a fiber glass end can be formed from each of bushing segments A-D. In some embodiments where at least one end is formed from a bushing segment, the ability to control the temperature of the bushing in the various segments can also result in better control of the sizes of the fiber glass ends produced. Thus, some embodiments of the present invention relate to methods and systems for controlling the temperature of a glass fiber forming bushing having multiple segments. Some embodiments of methods and systems of the present invention can generally be implemented on a wide variety of bushings including, without limitation, bushings of the present invention having terminal sites on each side wall.

Embodiments of the present invention can incorporate means for regulating the current passing through each bushing segment. One example of such regulating means is an adjustable current passing device. An adjustable current passing device regulates the amount of current passing through the bushing and the bushing segments. The term "adjustable current passing device" is used herein to refer to a device that can control the amount of overall current provided to and/or removed from the bushing and that can adjust the amount of current provided to and/or removed from bushing segments. An example of an adjustable current passing device useful in some embodiments of the present invention is the model #Rev. 1 BBC adjustable current passing device commercially available from Wizardry Inc. Other adjustable current passing devices can be selected depending on the parameters of a particular fiber glass manufacturing facility including, without limitation, the power provided to the manufacturing location, the size of the bushing, the number of terminal sites, the amount of current provided to the bushing, the throughput of the bushing, and other factors.

In the embodiment shown in FIG. 5, an adjustable current passing device 185 is connected across lines 172,175 and parallel to the transformer 160 and bushing 180 via lines 187,190. The adjustable current passing device is in the same phase as the current coming from the power pack in this embodiment. In addition, each individual bushing segment is connected to the adjustable current passing device 185 via lines 192a, 192b,195a, 195b, 197a, 197b. These lines 187, 190,192a, 192b,195a, 195b, 197a, 197b can be used to remove current from the bushing 180 or to add current to the bushing 180 using the adjustable current passing device 185. Each of pair of lines (192a and 192b; 195a and 195b; 197a and 197b) are coupled to the bushing using a single terminal in the embodiment shown in FIG. 5, although, in other embodiments, depending on voltage and current, each line could be connected to the bushing with its own terminal (i.e., two terminals at each terminal site).

The adjustable current passing device 185 can control the amount of current passing from the transformer 160 to the bushing 180 and the amount of current passing through each bushing segment. As the amount of current passing through each bushing segment affects the temperature in the bushing segment, the adjustable current passing device 185 can be used to adjust the temperature of the bushing segments by shunting current from a segment and/or by adding current to a segment. In some non-limiting embodiments, temperature sensors can be used to measure the temperature of the bushing and bushing segments.

In the embodiment shown in FIG. 5, the adjustable current passing device 185 controls the temperature of each individual segment of the bushing 180 by adjusting the amount of current provided to the bushing 180 from the transformer 160 and by individually adjusting the amount of current shunted from the bushing segment. As indicated above, an adjustable current passing device in other non-limiting embodiments can control the overall current provided to the bushing regardless of the source of the current (e.g., whether from a transformer, a battery, or other sources of current known to those of skill in the art).

The adjustable current passing device can be in communication with a controller. The controller can comprise a communications programmable logic controller or COMM PLC in some non-limiting embodiments, although persons of ordinary skill in the art can identify other controllers to control the flow of current in the bushing in accordance with embodiments of the present invention. For example, in other embodiments, the adjustable current passing device can be in communication with a programmable logic controller, or PLC, or a conventional computer system. An exemplary COMM PLC can comprise a device that handles communications from measurement devices, bushing balancing controllers, and other devices. A COMM PLC may handle inputs from one measuring device and one bushing balancing controller or may handle inputs from numerous measuring devices and bushing balancing controllers. In one embodiment, the COMM PLC can be used for an entire tank or plant. The COMM PLC may be in electronic communication with a computer system comprising software or programs that carry out various embodiments of the present inventions. For example, instructions related to the control of current in a bushing can be written in the Visual Basic programming language and executed on the computer system based on data received by the computer system. The specific hardware, firmware and/or software utilized in the system need not be of a specific type but may be any such conventionally available items designed to perform the method or functions of the present invention. The COMM PLC may also be connected to an input/output device such as a monitor and keyboard, mouse, touchscreen, etc.

While the controller is described above as being a COMM PLC in some embodiments, in other embodiments, the controller can be other devices known to those of skill in the art for providing instructions related to the control of current. An example of another such device is a computer system. A computer system can comprise a central processing unit (CPU) in electronic communication with a data storage device, such as a hard drive, optical disk, and the like for storing data. The CPU may also be in electronic communication with one or more of a read only memory (ROM) which stores CPU program instructions, a random access memory (RAM) for temporary data storage, and a clock for providing time signals to the CPU. An input/output device may be connected to the CPU and may be of any conventional type, such as a monitor and keyboard, mouse, touchscreen, printer, voice activated, etc. The computer system can run appropriate custom-designed or conventional software to carry out various embodiments of the present invention. For example, instructions related to the control of current in a bushing can be written in the Visual Basic programming language and executed on the computer system based on data received by the computer system. The specific hardware, firmware and/or software utilized in the system need not be of a specific type but may be any such conventionally available items designed to perform the method or functions of the present invention. The computer system described is an example of one suitable computer system for the practice of the invention. Such computer systems are well understood by one of ordinary skill in the art and examples are disclosed, for example, in U.S. Pat. Nos. 5,794,207; 5,884,272; 5,797,127; 5,504,674; 5,862,223; and 5,432,904, which are herein incorporated by reference.

An example of another such device is a programmable logic controller, or PLC. In some embodiments, both a computer system and a programmable logic controller can be used to control the current. Computer systems and programmable logic controllers may provide different advantages that can be advantageously combined in some embodiments of the present invention. Thus, in some embodiments, a controller can comprise a computer system, a programmable logic controller, or both a computer system and a programmable logic controller.

The controller can send instructions to the adjustable current passing device regarding the amount of current to provide to or shunt from the various bushing segments. In some embodiments, the controller can receive data from the adjustable current passing device. For example, the controller can receive data related to the amount of current that is provided to or shunted from the bushing segments. Thus, the controller can be in communication with the adjustable current passing device.

In the embodiment shown in FIG. 5, the controller is shown as the COMM PLC 215. In the embodiment shown, electrical lines 202, 204 connect the COMM PLC 215 with the adjustable current passing device 185. In the embodiment shown, two electrical lines 202, 204 are shown to indicate that information is being provided to the adjustable current passing device 185 from the COMM PLC 215, and vice versa. The COMM PLC 215 in FIG. 5 is shown in this exemplary embodiment to be in communication with a measurement device 210 via line 212 and in communication with a computer via line 213.

In this embodiment, the PLC 205 does not comprise a part of the controller. In this embodiment, the PLC 205 is associated with a particular forming position, the forming position comprising, for example, a bushing, a winder, and other devices used to convert molten glass to a fiber glass product. The PLC 205 can communicate instructions from various sources (e.g., human operators, controller 200, other controllers, etc.) to the various equipment at the forming position in order to adjust various process parameters. For example, with regard to the bushing, the PLC 205 can communicate a change in the total amount of current supplied to the bushing 180 via line 172. The PLC 205, in the embodiment shown, is in communication with the power pack 150 via line 209 and can communicate instructions from the computer 200 to increase or decrease the amount of current provided to the bushing 180. In some embodiments, PLC 205 can control a main set point temperature.

The COMM PLC 215 shown in FIG. 5 can be in communication with other forming positions and bushings (not shown). In some embodiments, each of the bushings may comprise the same components as are shown in FIG. 5, except that each bushing may share a common controller in some embodiments.

In some embodiments, the COMM PLC 215 can increase the total amount of current supplied by the power pack 150 using the PLC 205 via the computer 200 if, for example, the overall temperature of the bushing is too low (likewise, the COMM PLC 215 can also decrease the total amount of current if necessary). While electrical lines are shown connecting the COMM PLC 215 with the adjustable current passing device 185, the measurement device 210, and the computer 200 in FIG. 5, other means of communication (e.g., wireless) can be used in other non-limiting embodiments.

A controller used in some embodiments of the present invention can also be in communication with other components. For example, in some embodiments, a controller adjusts the amount of current passing through bushing segments in response to data that the controller receives from other components. A controller might adjust the amount of current passing through bushing segments based on measured temperatures of the bushing.

In some embodiments, a controller is in communication with means for measuring the size of fiber glass formed from a bushing. The measuring means can comprise, for example, means for weighing the fiber glass formed from the bushing, means for measuring the diameter of at least one fiber glass end formed from the bushing, means for weighing a fiber glass package formed from the bushing, and/or means for measuring the diameter of at least one fiber glass package formed from the bushing. In some embodiments, a single parameter regarding the size of the fiber glass is measured. In other embodiments, multiple size parameters (e.g., end diameter, package diameter, weight, etc.) are measured.

For bushings used to form two or more fiber glass ends, the size of each fiber glass end are measured in some embodiments. For example, in some embodiments where the bushing comprising multiple bushing segments each producing an end, the size data related to each end are measured. While it may be desirable to measure the size of each end, other embodiments may measure the size of a subset of the total number of ends. One advantage of measuring the size of an end from each bushing segment is that such data can be useful in analyzing the properties of each bushing segment and the bushing as a whole. The size of an end can refer to the size of the end prior to winding, chopping, or otherwise processing further, and can also refer to the size of a package after the end is wound into a package in those embodiments where the end is wound into a package.

Parameters relating to the size of the fiber glass produced from a bushing can be indicative of the bushing temperature. For example, bushing segments having high temperatures are generally expected to produce larger diameter ends, larger diameter packages, and heavier packages than bushing segments having lower temperatures. By measuring one or more of these size parameters, the size data can be used to make adjustments to the current passing through the bushing segments, if necessary, using the controller and other components of various embodiments of the present invention. For example, if a fiber glass package from a particular bushing segment weighs too much, the controller can instruct the alternate current passing device to shunt current from that bushing segment.

Various size parameters can be measured to determine whether to adjust or the amount of current being passed through a bushing or bushing segment. As noted above, such parameters can include, for example, the weight of an end, the diameter of an end, the weight of a package wound from an end, the diameter of a package wound from an end, and others. In general, larger end diameters, larger end weights, larger package diameters, and larger package weights can be indicative of a higher bushing temperature. Thus, if it is desirable to reduce the end size or the package size, the temperature of the bushing or bushing segment can be reduced. The temperature of the bushing or bushing segment is reduced by shunting current around the bushing or bushing segment in some embodiments. In embodiments where it is desirable to increase the end size or the package size by increasing the temperature of the bushing or a bushing segment, the temperature is increased by adding or injecting current into the bushing or a bushing segment.

In determining whether to adjust the amount of current passing through a bushing or bushing segment, some embodiments of the present invention comprise comparing the measured size of an end to a desired end size. A desired end size can be developed for any number of fiber glass products based on techniques known to those of skill in the art. Such desired end sizes may already exist for some size parameters. For example, manufacturers of fiber glass may already have established desired sizes for parameters such as end diameter, package diameter, package weight, etc. Such desired sizes can be based, for example, on the properties of the fiber glass being produced (e.g., filament diameter, number of filaments, type of glass, TEX of the product (grams per 1000 meters), etc.). It should also be understood that the term desired sizes can also comprise ranges. In other words, the desired size of an end might be a range. In some embodiments, if the measured size of the end falls within the range, no adjustment to the bushing or bushing segment temperature may be needed. In some embodiments where the desired size is a particular value, the measured size of the end can be compared to the desired size to determine whether an adjustment to the bushing or bushing segment temperature may be needed. As discussed below, an algorithm can be developed for the controller to determine whether to adjust the amount of current provided to a bushing segment.

Some embodiments of the present invention incorporate a measurement device in order to determine the size of an end. Various examples of such devices are mentioned below, although it should be understood that numerous devices for measuring such size parameters can be selected by persons of skill in the art for use in embodiments of the present invention.

To facilitate automation of certain embodiments of the present invention, measurement devices that are able to communicate with a controller are selected in some embodiments. In some embodiments, a measurement device can electronically communicate with the controller (e.g., via direct connection by cable, via the Internet, via wireless network, etc.). For example, the ability of a measurement device to transfer its measurement data to the controller can facilitate automation. Such transfer of data can provide the controller with real-time information and can assist the controller in determining whether to adjust the current provided to a bushing or a bushing segment. Some measurement devices may not be manufactured with the ability to communicate with a controller, but can be adapted to communicate with a controller using techniques known to those of skill in the art. In the embodiment shown in FIG. 5, a measurement device 210 is in electronic communication with the COMM PLC 215. In this embodiment, the measurement device and the controller communicate over a cable 212 or electrical line.

In some embodiments where a measurement device is not able to electronically transfer data to a controller, human operators can be used to provide the measurement data to the controller. For example, a human operator can take the measurement of the end and record it. The recorded measurement can then be provided to the controller in any number of ways known to those of skill in the art including, without limitation, manual entry into the controller, saving the data to a computer-readable medium and loading the data on the controller, etc.

A number of measurement devices can be selected for use in various embodiments of the present invention depending on the end property to be measured. As noted above, some embodiments can comprise measuring multiple properties, while some embodiments may measure one property. Measurement data can be electronically and automatically communicated directly to the controller and/or manually inputted into the controller, in various embodiments. In some embodiments, measurements can be taken at periodic intervals, for example every four hours.

In embodiments where the diameter of a package is measured, a laser sensor can be used to measure the diameter. Non-limiting examples of such devices are commercially available from WayCon Positionsmesstechnik GmbH. In such embodiments, the amount of time taken to wind the package can be important as the diameter of the wound package will increase the longer it winds. The diameter measurements in combination with winding times can be related to the temperature of the bushing as the diameter of the package wound in a certain period of time will be larger if the bushing temperature is higher (greater throughput of glass through the bushing). Thus, in some embodiments, means for measuring the diameter of a package can further comprise means for measuring the winding time. Winding times can be measured using techniques known to those of ordinary skill in the art. In some embodiments where winding times are measured, the winding times can also be communicated to the controller and can also be used by the controller to determine whether to adjust the current through the bushing or bushing segment.

In embodiments where the weight of a package is measured, a load cell can be used to weigh the package. A non-limiting example of a load cell that can be used in some embodiments of the present invention is model number 9363-B10-500-20TI from Revere Transducers. In some embodiments, the amount of time taken to wind the package can be important as the weight of the wound package will increase the longer it winds. The weight measurements in combination with winding times can be related to the temperature of the bushing as the weight of the package wound in a certain period of time will be larger if the bushing temperature is higher (greater throughput of glass through the bushing). Thus, in some embodiments, means for measuring the weight of a package can further comprise means for measuring the winding time. Winding times can be measured using techniques known to those of ordinary skill in the art. In some embodiments where winding times are measured, the winding times can also be communicated to the controller and can also be used by the controller to determine whether to adjust the current through the bushing or bushing segment.

In embodiments where the diameter of an end, or the diameter of filaments within an end, is measured, a device such as an optical non-contact device can be used to measure diameter of the filaments. Measuring the diameter of an end might be useful in some embodiments where the end is not wound into a package, although the diameter can generally be measured in most embodiments, whether wound into a package or not. Non-limiting examples of such devices are commercially available from Keyence Corporation. The diameter measurements can be related to the temperature of the bushing as the diameter of the end will be larger if the bushing temperature is higher (greater throughput of glass through the bushing).

In embodiments where the weight of an end is measured, a variety of devices can be used depending on when the end is weighed. Measuring the weight of an end might be useful in embodiments where the end is not wound into a package, although the end weight can also be measured prior to winding in embodiments where the end is wound into a package. In some embodiments, an end sample can be obtained and weighed. In such embodiments, the amount of time during which the sample was collected can also be measured. For example, an end sample can be collected over thirty seconds and then weighed. In some embodiments, an end sample can be weighed every hour, or over other periods. In some embodiments involving collection of an end sample, the end can be chopped (e.g., a chopped strand product) and chopped strands can be weighed. For example, a balance scale can be used to measure the weight of an end. Non-limiting examples of such devices are commercially available from A&D Company. The weights can be electronically and automatically communicated to the controller and/or manually inputted to the controller. The weight measurements can be related to the temperature of the bushing as the weight of the end will be larger if the bushing temperature is higher (greater throughput of glass through the bushing).

In some embodiments, the amount of time taken to collect an end sample can be important as the weight of the end will increase the longer the sample is collected. The weight measurements in combination with collection times can be related to the temperature of the bushing as the weight of the end sample in a certain period of time will be larger if the bushing temperature is higher (greater throughput of glass through the bushing). Thus, in some embodiments, means for measuring the weight of an end can further comprise means for measuring the collection time. Collection times can be measured using techniques known to those of ordinary skill in the art. In some embodiments where collection times are measured, the collection times can also be communicated to the controller and can also be used by the controller to determine whether to adjust the current through the bushing or bushing segment.

In some embodiments where the weight of an end is measured, the length of the end that is weighed can also be measured. The weight measurements in combination with length measurements can be related to the temperature of the bushing as the weight of the end sample having a certain length will be larger if the bushing temperature is higher (greater throughput of glass through the bushing). Thus, in some embodiments, means for measuring the weight of an end can further comprise means for measuring the length of the weighed end. Examples of the devices listed above which also measure the end length can include Skein reels. In some embodiments, the end lengths can also be communicated to the controller and can also be used by the controller to determine whether to adjust the current through the bushing or bushing segment.

As described above, a number of devices can be used to measure the sizes of ends according to embodiments of the present invention. One or more size properties (e.g., diameter, weight, length, measurement/collection time) can be measured in various embodiments of the present invention. In some embodiments, one size property can be measured, whereas in other embodiments, two or more size properties can be measured. A number of factors can be important in selecting the number of size properties to measure including, without limitation, the cost of the measurement equipment, the computer and other electronic resources required to analyze the collected data, the amount of labor required to collect the measurement data, the usefulness of having data related to multiple size properties in correlating the size of the end to the temperature of the bushing or bushing segment, and others.

In some embodiments, measuring the size of an end can comprise measuring the size of an end multiple times to collect a plurality of data. The collection of data can be used to develop a more statistically significant measurement, to identify trends, to allow real-time observation of end size data, etc. In some embodiments where a plurality of data is collected regarding an end size property, the measurement device can compile and manipulate the data (e.g., average the data) before communicating the data (or a summary of the data) to a controller. In other embodiments, the raw data may be communicated to the controller as the size property is measured. Once the data (or summary of the data) are received by the controller, the controller can analyze the data in some embodiments. The controller can compare the measured end sizes to a desired end size and determine whether to adjust the amount of current passing through the bushing segments in response to the end size comparisons.

In various non-limiting embodiments, the controller can be a proportional controller, an integral controller, a derivative controller, a proportional-integral-derivative (PID) controller, or other type of controller. In some embodiments, an algorithm can be developed for the controller to determine whether to adjust the amount of current provided to a bushing segment. In some non-limiting embodiments, the controller can comprise a computer system programmed with the algorithm. In other non-limiting embodiments, the controller can comprise a programmable logic controller programmed with the algorithm. In other non-limiting embodiments, the controller can comprise a computer system in communication with a programmable logic controller programmed with the algorithm.

The algorithm can be a variety of algorithms to analyze the measured end sizes and determine whether to adjust the amount of current provided to a bushing segment. Persons of ordinary skill in the art can develop an algorithm to correlate measured end sizes with bushing segment temperatures and to determine how to adjust the current provided to bushing segments. The parameters and constants used in the algorithm will generally be unique to the manufacturing process used, the product being manufactured, and the location of the manufacturing process. A different algorithm can be developed for each product manufactured at a particular manufacturing location. Factors that can be important in developing an algorithm include, without limitation, the product being manufactured, the typical break levels of the product, the bushing size, the number of tips in the bushing, filament diameter, the yardage of the product, the number of packages to be wound from the bushing, customer requirements (e.g., product uniformity requirements), the size parameter or size parameters being measured, the number of measurements to be made during manufacture, and others.

The algorithm can be programmed on a controller, a computer (e.g., computer 200 shown in FIG. 5), or server. When programmed with this algorithm, the computer system can act as a PID control system, in some non-limiting embodiments, based on feedback and process variability. The control system can also compare intended set point values with feedback values and adjust accordingly.

As noted above, a variety of algorithms can be developed for use in various embodiments of the present invention. Different algorithms may be needed when different size properties are measured. Persons of ordinary skill in the art can develop algorithms to correlate the size property or properties measured to the amount of current provided to or shunted from a bushing in various manufacturing processes and systems.

Desirable characteristics, which can be exhibited by embodiments of the present invention, can include, but are not limited to, the provision of a glass fiber forming bushing; the provision of methods and systems for controlling the temperature of a bushing having multiple segments; the provision of methods and systems that can improve the uniformity of the temperature at the tip plate of a bushing; the provision of methods and systems that can improve the uniformity of the flow velocity of a molten fiberizable material at the tip plate of a bushing; the provision of methods and systems that can improve the uniformity of the diameter of fibers produced from a bushing; the provision of methods and systems that can reduce the amount of break-outs of fibers during attenuation; the provision of methods and systems that can improve the efficiency of a fiber glass manufacturing process; the provision of methods and systems that improve uniformity of fiber glass products; and/or others.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

That which is claimed:

1. A method of controlling the temperature of a bushing having multiple segments, comprising:
    forming a plurality of filaments from a bushing, wherein the bushing comprises at least two segments and four or more terminals, wherein at least one of the terminals is coupled to a first side wall, at least one of the terminals is coupled to a second side wall, at least one of the terminals is coupled to a first end wall, and at least one of the terminals is coupled to a second end wall;
    gathering the filaments into at least two ends;
    measuring the size of each of the at least two ends;
    comparing the measured size of the at least two ends to a desired end size; and
    adjusting the amount of current passing through the at least two bushing segments in response to the end size comparisons.

2. The method of claim 1, wherein each end is formed from a separate bushing segment.

3. The method of claim 2, wherein measuring the size of each of the at least two ends comprises measuring the diameter of each end.

4. The method of claim 3, wherein comparing the measured size of the at least two ends to a desired end size comprises comparing the diameter of each end to a desired end diameter.

5. The method of claim 4, wherein adjusting the amount of current comprises increasing the amount of current passing through a bushing segment when the diameter of the end formed from the bushing segment is less than the desired end diameter.

6. The method of claim 5, wherein increasing the amount of current passing through a bushing segment comprises injecting current in a terminal proximate the bushing segment.

7. The method of claim 4, wherein adjusting the amount of current comprises shunting less current around the bushing segment when the diameter of the end formed from the bushing segment is less than the desired end diameter.

8. The method of claim 7, wherein shunting less current around the bushing segment comprises reducing the current removed from the bushing at a terminal proximate the bushing segment.

9. The method of claim 4, wherein adjusting the amount of current comprises shunting current around the bushing segment when the diameter of the end formed from the bushing segment is greater than the desired end diameter.

10. The method of claim 1, further comprising winding each end into a separate package.

11. The method of claim 10, wherein measuring the size of each of the at least two ends comprises weighing each package.

12. The method of claim 11, wherein comparing the measured size of the at least two ends to a desired end size comprises comparing the weight of each package to a desired package weight.

13. The method of claim 12, wherein adjusting the amount of current comprises increasing the amount of current passing through a bushing segment when the weight of the package formed from the bushing segment is less than the desired package weight.

14. The method of claim 13, wherein increasing the amount of current passing through a bushing segment comprises adding current in a terminal proximate the bushing segment.

15. The method of claim 12, wherein adjusting the amount of current comprises shunting less current around the bushing segment when the weight of the package formed from the bushing segment is less than the desired package weight.

16. The method of claim 15, wherein shunting less current around the bushing segment comprises reducing the current removed from the bushing at a terminal proximate the bushing segment.

17. The method of claim 12, wherein adjusting the amount of current comprises shunting current around the bushing segment when the weight of the package formed from the bushing segment is greater than the desired package weight.

18. The method of claim 10, wherein measuring the size of each of the at least two ends comprises measuring the diameter of each package.

19. The method of claim 18, wherein comparing the measured size of the at least two ends to a desired end size comprises comparing the diameter of each package to a desired package diameter.

20. The method of claim 19, wherein adjusting the amount of current comprises increasing the amount of current passing through a bushing segment when the diameter of the package formed from the bushing segment is less than the desired package diameter.

21. The method of claim 20, wherein increasing the amount of current passing through a bushing segment comprises injecting current in a terminal proximate the bushing segment.

22. The method of claim 19, wherein adjusting the amount of current comprises shunting less current around the bushing segment when the diameter of the package formed from the bushing segment is less than the desired package diameter.

23. The method of claim 22, wherein shunting less current around the bushing segment comprises reducing the current removed from the bushing at a terminal proximate the bushing segment.

24. The method of claim 19, wherein adjusting the amount of current comprises shunting current around the bushing segment when the diameter of the package formed from the bushing segment is greater than the desired package diameter.

25. A method of controlling the temperature of a bushing having multiple segments, comprising:
   forming a plurality of filaments from a bushing, wherein the bushing comprises a power supply, at least two segments, five or more terminals, and two opposing side walls perpendicular to two opposing end walls, wherein the length of the side walls is greater than the length of the end walls, and wherein at least one terminal is coupled to each end wall, at least two terminals are coupled to the side wall positioned furthest from the power supply, and at least one terminal is coupled to the side wall positioned closest to the power supply;
   gathering the filaments into at least two ends;
   measuring the size of each of the at least two ends;
   comparing the measured size of the at least two ends to a desired end size; and
   adjusting the amount of current passing through the at least two bushing segments in response to the end size comparisons.

26. A method of controlling the temperature of a bushing having multiple segments, comprising:
   forming a plurality of filaments from a bushing, wherein the bushing comprises at least two segments, four or more terminals, and two opposing side walls perpendicular to two opposing end walls, wherein the length of the side walls is greater than the length of the end walls, and wherein at least one terminal is coupled to each side wall and at least one terminal is coupled to each end wall;
   gathering the filaments into at least two ends;
   measuring the size of each of the at least two ends;
   comparing the measured size of the at least two ends to a desired end size; and
   adjusting the amount of current passing through the at least two bushing segments in response to the end size comparisons.

* * * * *